United States Patent
Pichot

(10) Patent No.: US 10,018,740 B2
(45) Date of Patent: *Jul. 10, 2018

(54) COUPLING DEVICE FOR SEISMIC SENSORS

(71) Applicant: SERCEL, Carquefou (FR)

(72) Inventor: Yann Pichot, Orvault (FR)

(73) Assignee: SERCEL, Carquefou (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,047

(22) Filed: Sep. 26, 2016

(65) Prior Publication Data

US 2017/0010371 A1 Jan. 12, 2017

Related U.S. Application Data

(63) Continuation of application No. 14/049,580, filed on Oct. 9, 2013, now Pat. No. 9,494,449.

(30) Foreign Application Priority Data

Oct. 9, 2012 (EP) .................................... 12306235

(51) Int. Cl.
*G01V 1/16* (2006.01)
*F16B 17/00* (2006.01)
(Continued)

(52) U.S. Cl.
CPC .............. *G01V 1/166* (2013.01); *F16B 17/00* (2013.01); *G01D 11/30* (2013.01); *G01S 7/521* (2013.01);
(Continued)

(58) Field of Classification Search
CPC ......... G01D 11/30; F16B 17/00; G01S 7/521; G01V 1/16
(Continued)

(56) References Cited

U.S. PATENT DOCUMENTS 6,262,945 B1 * 7/2001 Maples ................ G01V 1/3808
367/154
6,307,808 B1 * 10/2001 Schmidt ................. G01V 1/166
367/178
(Continued)

FOREIGN PATENT DOCUMENTS

CN 101071174 A 11/2007
CN 201383007 Y 1/2010
(Continued)

OTHER PUBLICATIONS

Office Action in corresponding Chinese Application No. 201310437219.6 dated Dec. 2, 2016.
(Continued)

*Primary Examiner* — Isam A Alsomiri
*Assistant Examiner* — Amie M N'Dure
(74) *Attorney, Agent, or Firm* — Patent Portfolio Builders PLLC

(57) ABSTRACT

A coupling device is provided for a sensor unit having at least one sensor located within a housing. The coupling device includes at least one supporting portion, wherein the supporting portion is configured for maintaining the sensor unit in a stable position, with the coupling device either resting on or being buried into the ground, and at least one rod, arranged in a plane which is essentially perpendicular to a peripheral surface of the supporting portion and linked to the supporting portion. The coupling device further includes a fastener for connecting the sensor unit to the coupling device. The supporting portion maintains the sensor unit in a stable position when resting on the ground, while the rod provides an additional stiffness to the housing.

22 Claims, 3 Drawing Sheets

(51) Int. Cl.
　　　*G01D 11/30* 　　(2006.01)
　　　*G01S 7/521* 　　(2006.01)
　　　*G01V 1/18* 　　(2006.01)

(52) U.S. Cl.
　　　CPC .............. *G01V 1/16* (2013.01); *G01V 1/181* (2013.01); *Y10T 403/52* (2015.01); *Y10T 403/70* (2015.01)

(58) Field of Classification Search
　　　USPC .......................................................... 367/15
　　　See application file for complete search history.

(56) References Cited

U.S. PATENT DOCUMENTS

| | | | | |
|---|---|---|---|---|
| 6,353,577 | B1* | 3/2002 | Orban | G01V 1/201 367/178 |
| 7,352,654 | B2* | 4/2008 | Goujon | G01V 1/3852 367/188 |
| 7,730,786 | B2* | 6/2010 | Pichot | G01V 1/16 73/584 |
| 8,520,469 | B2* | 8/2013 | Ronnow | G01V 1/364 367/43 |
| 2004/0252585 | A1* | 12/2004 | Smith | G01V 1/16 367/66 |
| 2009/0007673 | A1* | 1/2009 | Pichot | G01V 1/16 73/584 |
| 2011/0085419 | A1* | 4/2011 | Ronnow | G01V 1/364 367/43 |

FOREIGN PATENT DOCUMENTS

| | | |
|---|---|---|
| FR | 2918462 A1 | 1/2009 |
| GB | 2450789 A | 7/2009 |
| WO | 96/10195 A1 | 4/1996 |

OTHER PUBLICATIONS

European Search Report and Written Opinion dated Feb. 6, 2013 for corresponding European Application No. 12306235, filed Oct. 9, 2012.

Office Action in parent U.S. Appl. No. 14/049,580, dated Jul. 15, 2015.

Final Office Action in parent U.S. Appl. No. 14/049,580, dated Feb. 24, 2016.

* cited by examiner

COUPLING DEVICE FOR SEISMIC SENSORS

1. FIELD OF THE INVENTION

The invention pertains to the geophysical domain, and relates to applications in which sensor units are used to map subterranean properties of a given geographical area.

More specifically, the invention relates to coupling devices for such sensor units enabling to position the sensor units on the surface of said geographical area.

Although the invention may be used in various applications involving acquisition of seismic data through a network of sensor units, it is of particular interest to the oil prospection industry.

2. BACKGROUND OF THE INVENTION

In the known state of the art, seismic data are collected by networks of electronic sensor units, which are connected to a central processing server.

Each sensor unit comprises at least one sensor located within a housing, which features a bottom surface intended to be mechanically coupled with the ground. To this end, a sensor unit is usually equipped with a coupling device having the shape of a spike, which is to be buried into the ground. Such a spike is described in a French patent application FR 2918462.

Such a solution is not entirely satisfactory. It has proven impractical in applications where the ground is too hard for a spike to be buried into it, as is the case on urban premises. In such a situation, the sensor unit will have to be simply laid down on the ground and will thus be very unstable, the end result being that the measurements it will take will probably be inaccurate.

For similar reasons, the known solution is impractical when used in arctic conditions. Specially adapted spikes have been designed for such conditions, but these special spikes are very heavy and therefore are detrimental to operational efficiency.

Furthermore, a spike-shaped coupling device may be insufficiently effective to ensure sensor stability in loose soil, e.g. when the ground is made of sand or mud, in which case the spike won't be maintained in position as well as it would be in a more dense, and thus less shifting, environment.

In order to solve this stability problem, additional pedestals in the form of tripods or quadripods are sometimes used, but such pedestals have a tendency to resonate on their own modes and produce non-desired resonant frequencies, which is detrimental to the operational efficiency of the sensor. These non-desired resonant frequencies (noise) would pollute the measured data consequently especially if said sensor is a digital seismic sensor because of their high sensitivity to noise.

Some known sensor units are equipped with a housing featuring a cylindrical pod protruding from the housing's bottom, the spike then being fastened to the end of said pod. In such sensor units, the actual sensor is located in the pod, and thus will be located underground after the spike is properly buried into the ground. In such a configuration, the sensor will be less sensitive to surface noise. However, this design presents a drawback due to the elongated shape of the pod protruding from the housing's bottom, which will tend to resonate at a frequency comprised within the bandwidth under study and may thus significantly alter the operational performance of the sensor unit.

3. SUMMARY OF THE INVENTION

An exemplary embodiment of the invention introduces a coupling device for a sensor unit comprising at least one sensor located within a housing, which coupling device includes at least one supporting portion, said supporting portion being configured for maintaining the sensor unit in a stable position, the coupling device either resting on or being buried into the ground, and at least one rod, arranged in a plane which is essentially perpendicular to a peripheral surface of the supporting portion and linked to said supporting portion, said coupling device further including fastening means for connecting the sensor unit to the coupling device.

The coupling device according to the invention is remarkable in that it enables to solve two problems simultaneously. The supporting portion will maintain the sensor unit in a stable position when resting on or buried into the ground, while the rod or rods linked to the supporting portion will provide an additional stiffness to the sensor unit's housing, and thus suppress resonating frequencies which would be generated by a housing.

According to a further embodiment of the invention, a coupling device as described hereinbefore will advantageously have a symmetric shape with respect to at least one plane which is essentially perpendicular with respect to the supporting portion.

Such a symmetric shape allows a homogeneous mass distribution in the horizontal plane when the coupling device is placed on or buried into the ground, which will thus contribute to prevent the coupling device from vibrating in operating conditions.

According to a particular embodiment of the invention, a coupling device as described above includes at least one rod, and features at least a first supporting portion against which said housing is to be maintained in position and a second supporting portion having a peripheral section essentially parallel to a peripheral section of the first supporting portion, said first and second supporting portions being linked together by said at least one rod.

Such a coupling device is particularly well suited to housings featuring at least one shoulder portion against which may be positioned against the first supporting portion.

According to a specific embodiment, a coupling device as described hereinbefore includes at least two rods linking together said first and second supporting portions, and at least one partially peripheral fin arranged in parallel with at least one peripheral section of the first and second supporting portions.

Multiple rods will increase the stiffening effect produced by the coupling device, which effect will be yet again magnified by the fins. A further reason for using a combination of rods and fins instead of a plain shape like a cylinder lies in the spaces separating said fins and rods, which allow loose soil (like sand for example) to flow within the space delimited by the external surface of the coupling device. The filling of this space will simultaneously produce a double advantage, since it will help anchor the coupling device on or even within the ground, and it will allow direct contact between the ground and the housing, which will enhance the performance of the sensor.

According to a specific embodiment, a coupling device as described hereinbefore features a third supporting portion upon which an end of the housing is to be fastened, said third supporting portion being placed between the first and second supporting portions, According to a specific embodiment, the first supporting portion is provided with a groove supporting an O-ring and intended to be located between the coupling device and the housing. In this embodiment, the O-ring will compensate any clearance between the third supporting portion and the end of the housing, thus ensuring that the housing and the coupling device are firmly fastened to each other. Since the third supporting portion is arranged between the first and second supporting portions, the end of the housing is located well within the coupling device when the housing is fastened to it, which will help to protect the sensor's integrity in case of an impact between the second supporting portion and the ground.

According to a variant of the above described specific embodiment, the third supporting portion includes a through hole intended to be passed through by screwing means for fastening the end of the housing to the third supporting portion.

The screwing means may be formed by providing the end of the housing with a male thread protruding through said hole, which male thread will then be complemented by a nut pressing against the bottom side of the third portion. Conversely, the screwing means may be formed by providing the end of the housing with a female thread, which will then be completed by a screw whose head will press against the bottom side of the third portion.

According to yet another embodiment of the invention, a bottom part of the second supporting portion includes dampening means.

These dampening means are intended to preserve the physical integrity of the sensor in cases where the assembly formed by the sensor unit and its associated coupling device is dropped on the ground.

According to a further embodiment of the invention, the peripheral sections of the supporting portions have a circular shape.

The physical properties of a coupling device inherent to such a symmetric shape impart to the assembly formed by the sensor unit and the coupling device an optimal resistance to resonance effects.

According to another of its material aspects, the invention also relates to a sensor unit adapted to be fastened to a coupling device as described hereinbefore.

According to a further embodiment, said at least one sensor is a one vertical component digital sensor or a three orthogonal component digital sensor like a geophone or an accelerometer.

According to a further embodiment, said at least one sensor is digital seismic sensor.

4. BRIEF DESCRIPTION OF DRAWINGS

The characteristics and advantages of the invention will become clearer by reading the following description of a preferred embodiment, given as a non-limiting example, and in reference to the attached figures in which.

5. DETAILED DESCRIPTION OF THE INVENTION 5.1 General Principle

The coupling device according to an embodiment of the invention is remarkable in that it enables to solve two problems simultaneously, by means of at least one supporting portion which will maintain the sensor unit in a stable position when resting on or buried into the ground, while a rod or rods linking both supporting portions will provide an additional stiffness to the sensor unit's housing.

5.2 Description of a Specific Embodiment

Figure 1:
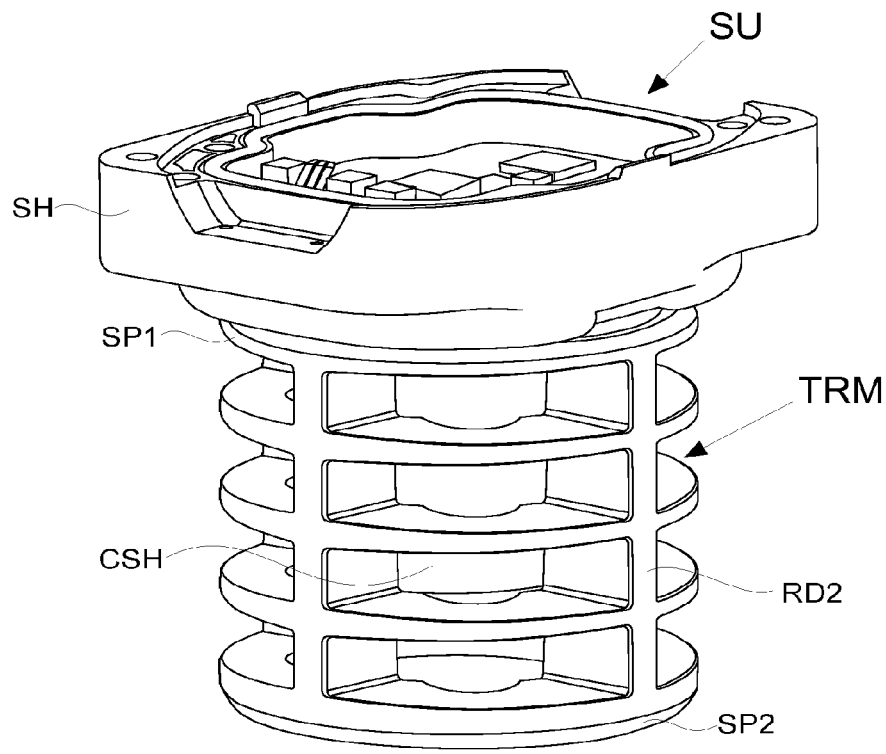
FIG. 1 is a view in perspective of an assembly of a sensor unit with a coupling device according to an embodiment of the invention.
Figure 2:
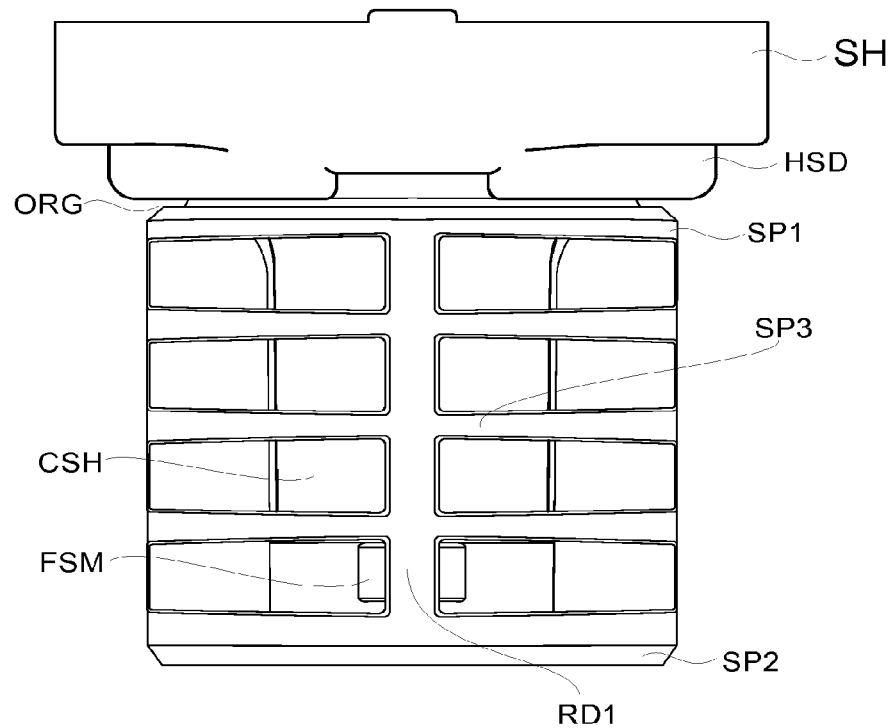
FIG. 2 is a side view of an assembly of a sensor unit with a coupling device according to an embodiment of the invention.

FIG. 1 and FIG. 2 disclose a coupling device TRM for a sensor unit SU comprising at least one sensor located within a housing SH, which coupling device TRM includes in this embodiment four rods of which only a first and a second rods RD1 and RD2 are shown here.

The sensor may be a one vertical component digital sensor or a three orthogonal component digital sensor like a geophone or an accelerometer.

The coupling device TRM features a first supporting portion SP1 featuring a groove supporting an O-ring ORG against which a shoulder portion HSD of the housing SH is pressed by fastening means FSM, which will be described in more detail hereinafter. The coupling device TRM features a second supporting portion SP2 having in this example a circular peripheral section essentially parallel to a peripheral section of the first supporting portion SP1, said first and second supporting portions SP1 and SP2 being linked together by the rods.

The O-ring may alternately be included in the fastening means FSM. In this case, the coupling device is hardly force-fitted against the shoulder portion HSD of the housing SH.

In the specific embodiment shown here, the housing SH features a cylindrical pod CSH protruding from the housing's bottom, the end of said pod CSH being fastened to a third supporting portion SP3 by the fastening means FSM, said third supporting portion SP3 being essentially parallel to the first supporting portion SP1. In this embodiment, sensor is located inside the cylindrical pod CSH.

The second supporting portion SP2 is to be placed on a hard ground in operational conditions. In this case, hard ground does not allow to bury the sensor unit in the ground. The sensor unit will thus be maintained in a stable position when the assembly of the sensor unit SU with the coupling device rests on the ground, while the rods linking both supporting portions SP1 and SP2 will provide an additional stiffness to the sensor unit's housing SH, and will thus prevent the pod from entering into resonance, which will hence significantly increase the operational performance of the sensor unit.

Figure 3:
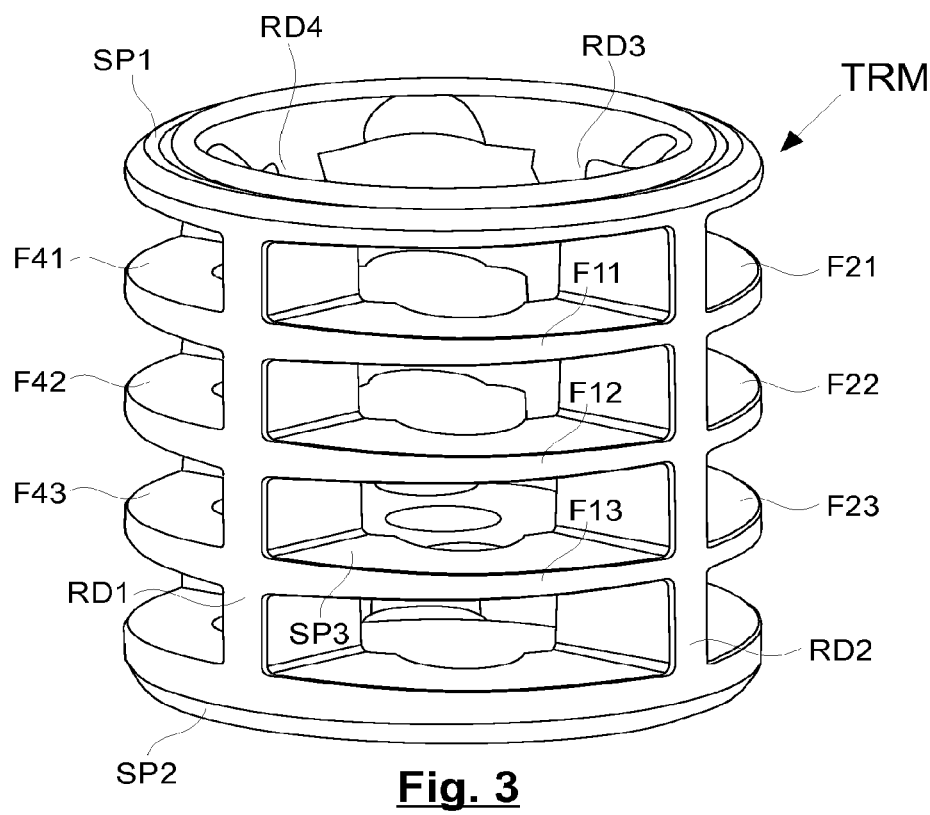
FIG. 3 is a view in perspective of a coupling device according to an embodiment of the invention.
Figure 4:
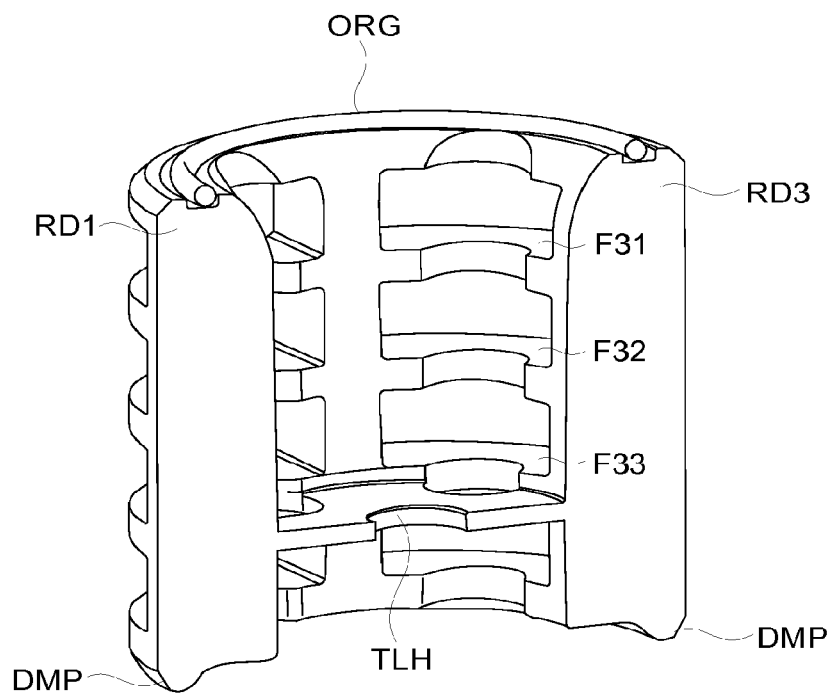
FIG. 4 is a view in perspective of the inside of a coupling device according to an embodiment of the invention.

FIG. 3 and FIG. 4 are more detailed views of the coupling device TRM showing its four rods RD1, RD2, RD3 and RD4.

In this embodiment, the coupling device TRM further includes three rows of partially peripheral fins Fij (for i=1 to 4 and j=1 to 3) arranged in parallel with the peripheral of the first and second supporting portions sections SP1 and SP2.

As explained above, the use of multiple rods amplifies the stiffening effect produced by the coupling device, which effect will be yet again magnified by the fins. A further reason for using a combination of rods and fins instead of a plain shape like a cylinder lies in the spaces separating said fins and rods, which allow loose soil like mud or sand to flow within the space delimited by the external surface of the coupling device. The filling of this space will simultaneously produce a double advantage, since it will help anchor the coupling device on or even within the ground, and it will allow direct contact between the ground and the housing, which will enhance the performance of the sensor.

As shown in FIG. 3, the fins Fi3 (for i=1 to 4) of the bottom row can be connected together so as to form the third supporting portion SP3 to which the end of the housing's bottom pod is to be fastened. In this embodiment, the first supporting portion SP1 is provided with a groove which will be located between the coupling device TRM and the housing. This groove supports an O-ring ORG which allows to compensate any clearance between the third supporting portion SP3 and the end of the housing, thus ensuring that the housing and the coupling device are firmly fastened to each other. The hardness value of the O-ring ORG may for example be 90 Shore A.

In this specific embodiment of the invention, the bottom part of the second supporting portion SP2 includes dampening means DMP, formed by an annular protuberance of said second supporting portion SP2. Provided that a material having some elasticity is chosen for producing the coupling device TRM, like for example a 6 66 polyamide loaded at 30% in fiberglass, with an elasticity modulus around 5300 MPa, the annular protuberance will be able to behave like a shock absorber in case of an impact of the bottom of bottom of the coupling device TRM with a hard surface, and thus preserve the physical integrity of the sensor. In other embodiments, an annular piece of an elastic material like rubber could be used as dampening means.

According to a variant of the above described specific embodiment, the third supporting portion SP3 includes a through hole THL intended to be passed through by screwing means for fastening the end of the housing to the third supporting portion SP3.

Figure 5:
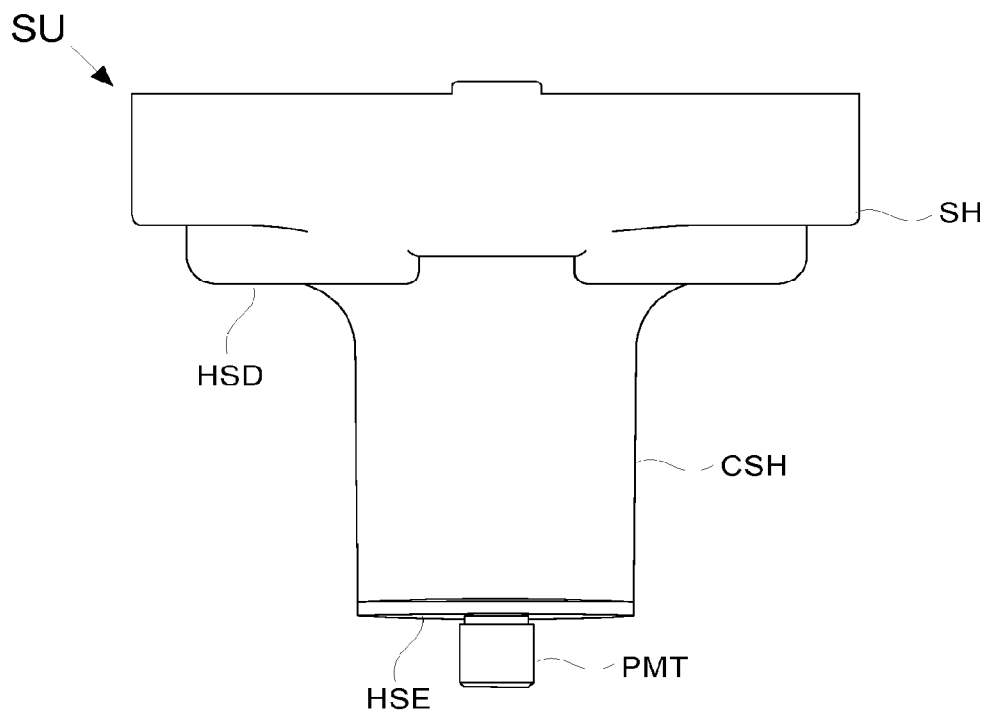
FIG. 5 is a side view of a sensor unit adapted to be fastened to a coupling device according to an embodiment of the invention.
Figure 6:
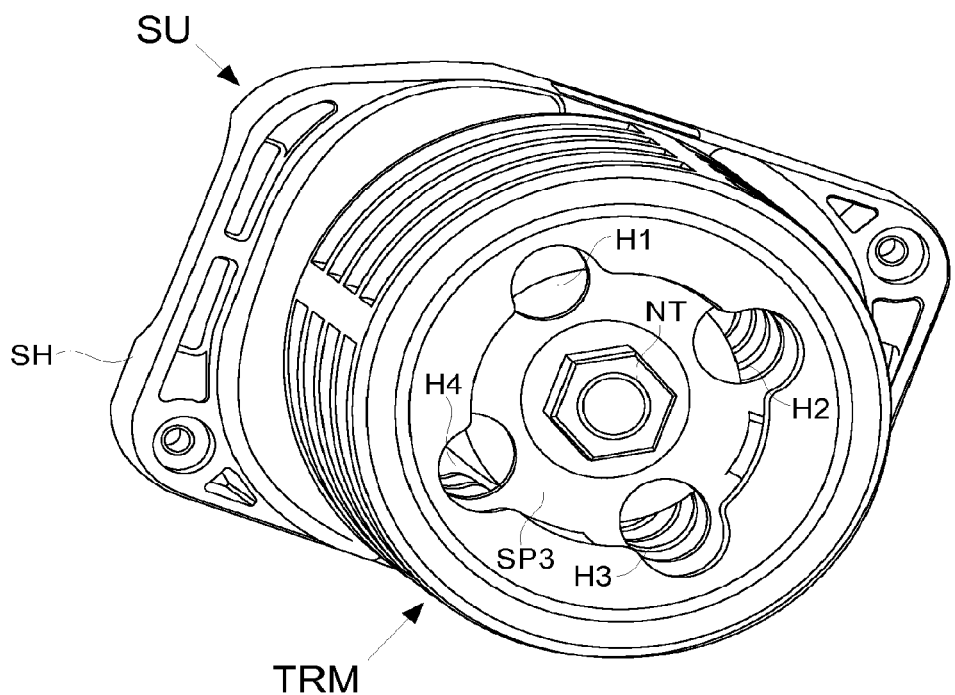
FIG. 6 is a view from a bottom perspective of an assembly of a sensor unit with a coupling device according to an embodiment of the invention.

FIG. 5 and FIG. 6 illustrate a possible embodiment of the screwing means, in which the end HSE of the pod CSH is provided with a male thread PMT intended to protrude through the hole included in the third supporting portion SP3 of the coupling device, which male thread will then be complemented by a nut NT pressing against the bottom side of the third portion SP3.

In other embodiments not shown here, the screwing means may be formed by providing the end HSE of the pod CSH with a female thread, which will then be completed by a screw whose head will press against the bottom side of the third portion SP3.

Advantageously, the male or female treads featured by the end HSE of the pod CSH will also be compatible with complementary threads featured at the end of a spike as described in the introduction of the present patent application.

In the embodiment shown in FIG. 6, the coupling device TRM features holes H1, H2, H3 and H4, which allow loose soil like mud or sand to flow enter from the bottom surface of the third supporting portion SP3 into the space delimited by the external surface of the coupling device TRM.

The above-described invention ensures that the sensor unit will remain stable even when it is used in loose soil or on hard ground into which it is impossible to drive a spike.

When the sensor unit equipped with a coupling device according to the invention is operating while placed on or buried into the ground, the coupling device ensures good stability of the sensor.

An exemplary embodiment of the invention offers a solution which is essentially unaffected by the above mentioned drawbacks of the prior art, by providing a coupling device for a sensor unit which enables said unit to stay in a stable position even if it is only laid down on the ground, and which significantly reduces the risk for a bottom pod of the sensor housing to resonate in operating conditions.

The invention claimed is:

1. A coupling device for coupling a sensor unit to ground, the coupling device comprising:
    a first supporting portion configured to receive and support the sensor unit;
    a second supporting portion configured to be coupled to the ground; and
    a first rod rigidly connecting the first supporting portion to the second supporting portion and maintaining the first supporting portion away from the second supporting portion,
    wherein the first supporting portion is configured to have an opening to allow a pod of the sensor unit to enter, through the opening, inside the coupling device while another part of the sensor unit remains outside the coupling device, the first and second supporting portions being separated by spaces.

2. The coupling device of claim 1, further comprising:
    a second rod rigidly connecting the first supporting portion to the second supporting portion; and
    a fin connecting the first rod to the second rod.

3. The coupling device of claim 1, further comprising:
    plural fins connecting to the first rod so that soil enters inside spaces formed between the plural fins and the first rod.

4. The coupling device of claim 3, wherein the plural fins are located between the first and second supporting portions.

5. The coupling device of claim 1, further comprising:
    a dampening material attached to the second supporting portion, on a face opposite to the first supporting portion.

6. The coupling device of claim 1, further comprising:
    a third supporting portion, located between the first and second supporting portions, and configured to receive the pod of the sensor unit.

7. The coupling device of claim 6, wherein the third supporting portion has a hole through which the pod passes through.

8. The coupling device of claim 7, further comprising:
    plural holes formed in the third supporting portion for allowing the soil to enter inside the coupling device to couple directly with the pod of the sensor unit.

9. The coupling device of claim 1, further comprising:
    a third supporting portion, located between the first and second supporting portions, and configured to receive, on a face, an end of the pod of the sensor unit and, on an opposite face, screwing means for fastening the end of the pod to the third supporting portion.

10. The coupling device of claim 1, wherein the first supporting portion has a groove.

11. The coupling device of claim 10, wherein the groove is configured to receive an O-ring to be located between the first supporting portion and the sensor unit.

12. A system for collecting seismic data, the system comprising:
- a sensor unit configured to record the seismic data; and
- a coupling device for coupling the sensor unit to ground, wherein the sensor unit comprises:
- a housing, and
- a sensor located inside the housing and configured to record the seismic data, and wherein the coupling device comprises:
- a first supporting portion configured to receive and support the housing of the sensor unit;
- a second supporting portion configured to be coupled to the ground; and
- a first rod rigidly connecting the first supporting portion to the second supporting portion and maintaining the first supporting portion away from the second supporting portion,
- wherein the first supporting portion is configured to have an opening to allow a pod of the sensor unit to enter, through the opening, inside the coupling device while another part of the sensor unit remains outside the coupling device, the first and second supporting portions being separated by spaces.

13. The system of claim 12, wherein the sensor is located inside the pod, the pod enters inside the coupling device through the first supporting portion, and the housing is supported by the first supporting portion, outside the coupling device.

14. The system of claim 12, wherein the coupling device further comprises:
- plural fins connecting to the first rod so that soil enters inside spaces formed between the plural fins and the first rod.

15. The system of claim 14, wherein the plural fins are located between the first and second supporting portions.

16. The system of claim 12, wherein the coupling device further comprises:
- a dampening material attached to the second supporting portion, on a face opposite to the first supporting portion.

17. The system of claim 12, wherein the coupling device further comprises:
- a third supporting portion, located between the first and second supporting portions, and configured to receive the pod of the sensor unit,
- wherein the third supporting portion has a hole through which the pod passes through.

18. The system of claim 17, wherein the coupling device further comprises:
- plural holes formed in the third supporting portion for allowing the soil to enter inside the coupling device and couple directly with the pod of the sensor unit.

19. The system of claim 12, wherein the coupling device further comprises:
- a third supporting portion, located between the first and second supporting portions, and configured to receive, on a face, an end of the pod of the sensor unit and, on an opposite face, screwing means for fastening the pod to the third supporting portion.

20. The system of claim 12, wherein the sensor is one of a vertical component digital sensor, a three orthogonal component digital sensor, a digital geophone or a digital accelerometer.

21. The coupling device of claim 1, wherein the first rod is a wall integrally made with the first supporting portion and the second supporting portion.

22. The system of claim 12, wherein the first rod is a wall integrally made with the first supporting portion and the second supporting portion.

* * * * *